United States Patent [19]

Schnur

[11] 4,169,330

[45] Oct. 2, 1979

[54] FISHING GAFF

[76] Inventor: Jerry Schnur, 123 Lorraine Gate, East Meadow, N.Y. 11554

[21] Appl. No.: 831,168

[22] Filed: Sep. 7, 1977

[51] Int. Cl.² .............................................. A01K 81/00
[52] U.S. Cl. ...................................................... 43/5
[58] Field of Search .................... 43/5, 6, 43.16, 44.83

[56] References Cited

U.S. PATENT DOCUMENTS

| | | | |
|---|---|---|---|
| 1,506,068 | 8/1924 | Lange | 43/6 |
| 2,677,911 | 5/1954 | Fink | 43/5 |
| 2,717,800 | 9/1955 | Chatten | 43/6 |
| 3,004,362 | 10/1961 | Day | 43/6 |
| 3,833,252 | 9/1974 | Redding | 43/5 |
| 3,863,377 | 2/1975 | Lenord | 43/6 |
| 3,991,502 | 11/1976 | Tudisco | 43/5 |

*Primary Examiner*—Harold D. Whitehead

[57] ABSTRACT

A hook, for use by fishermen for gaffing a fish, is carried by a member which is releasably anchored to a pole, and may be manipulated by the fisherman positively to engage in the fish; and then the member, carrying the hook which has been caught in the fish, may be disengaged from the pole by the fisherman by manipulating means to release the anchorage, while a rope or cable, attached to the same member, which rope, in the meantime, has not required the use of either of the hands of the fisherman may now be used for pulling in the hooked fish.

10 Claims, 10 Drawing Figures

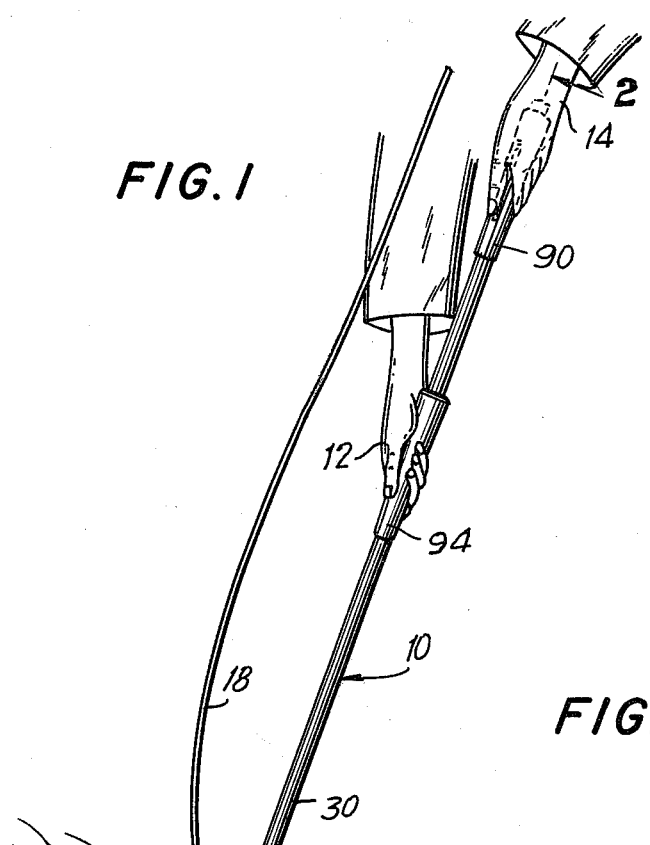
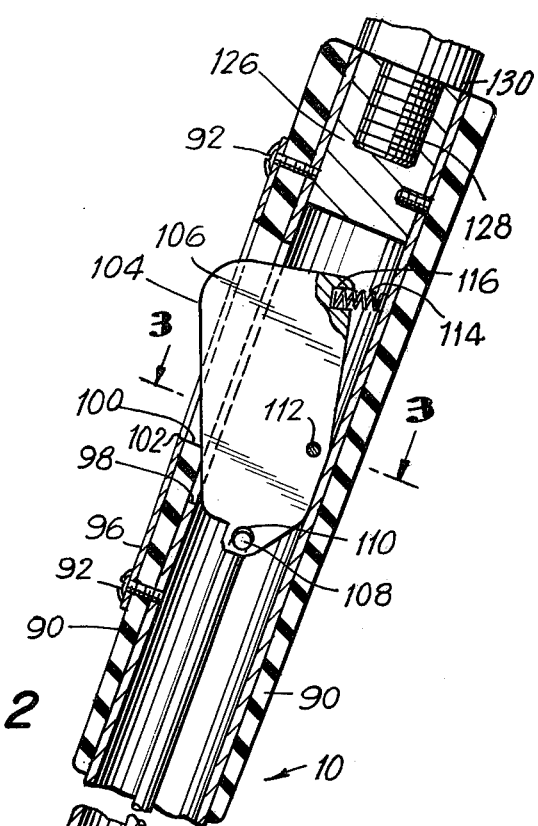
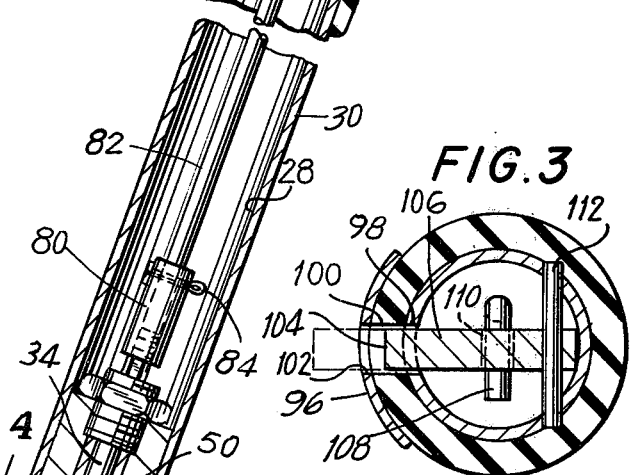
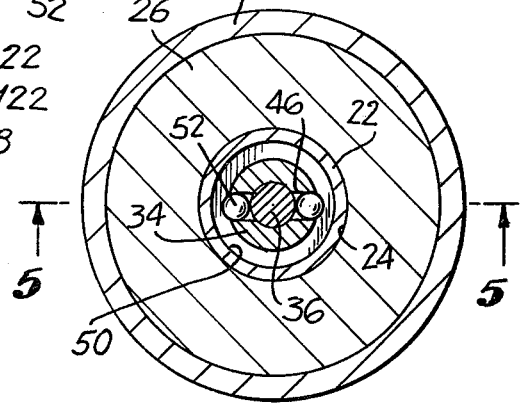

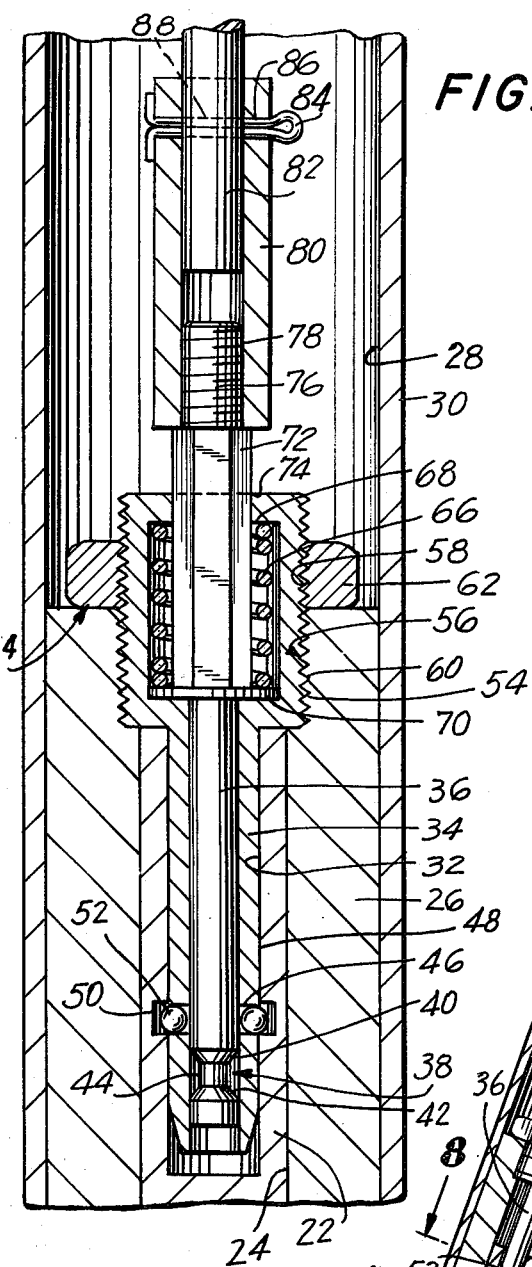
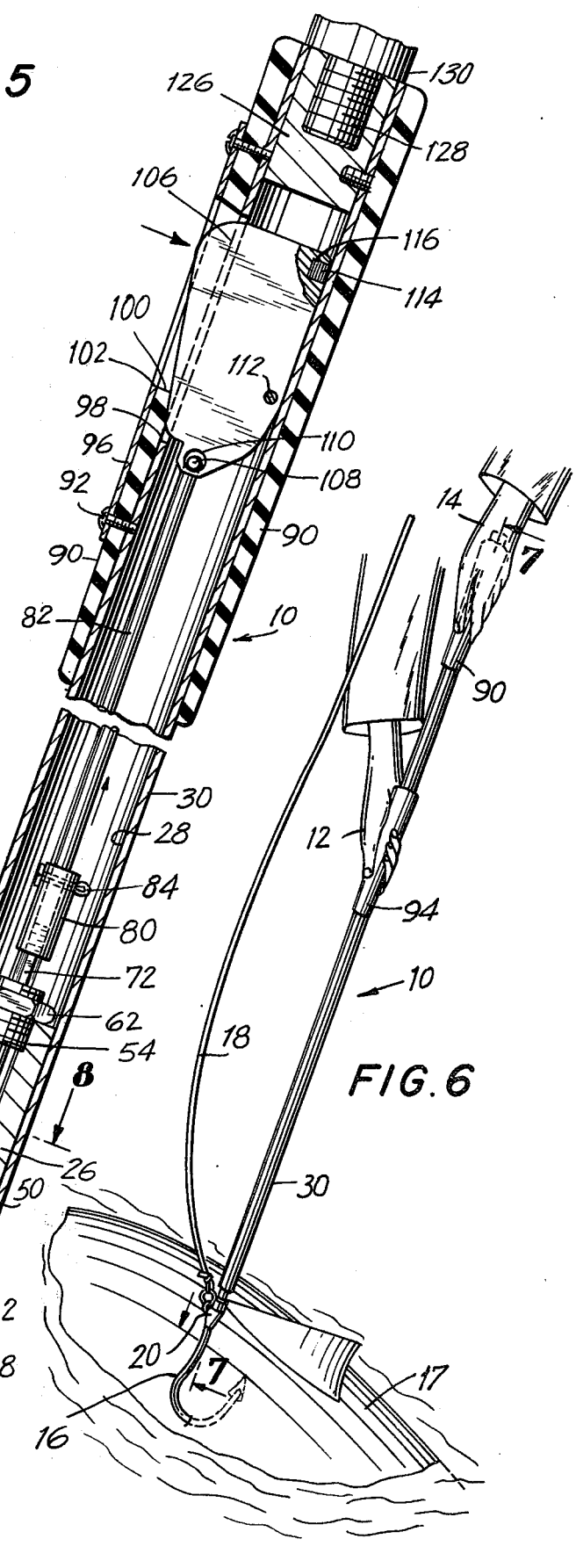
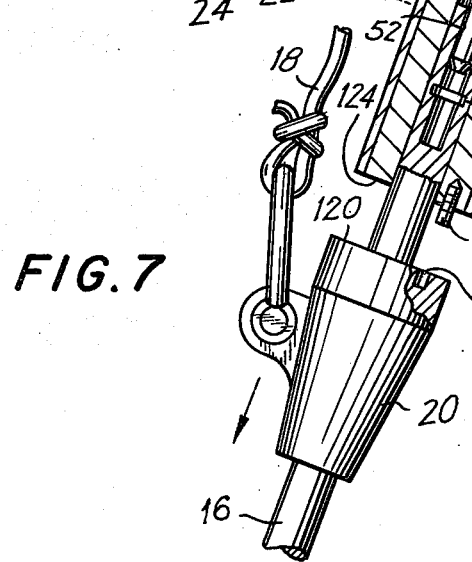
FIG. 5
FIG. 6
FIG. 7

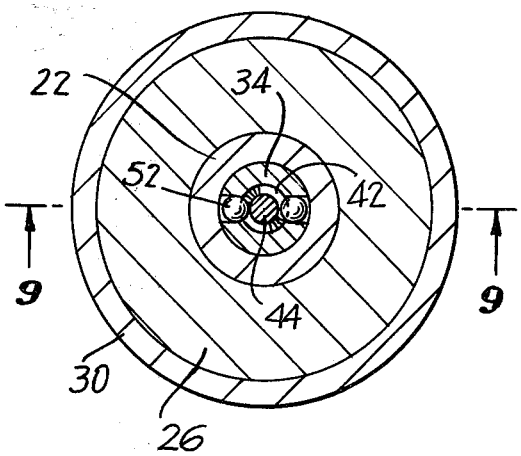
FIG. 8
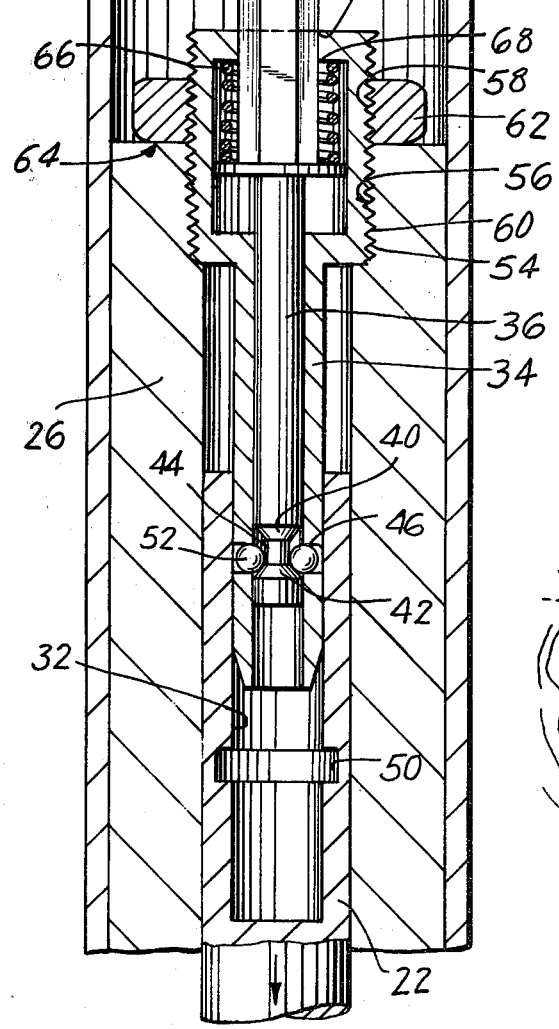
FIG. 9
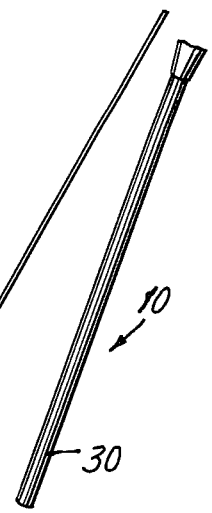
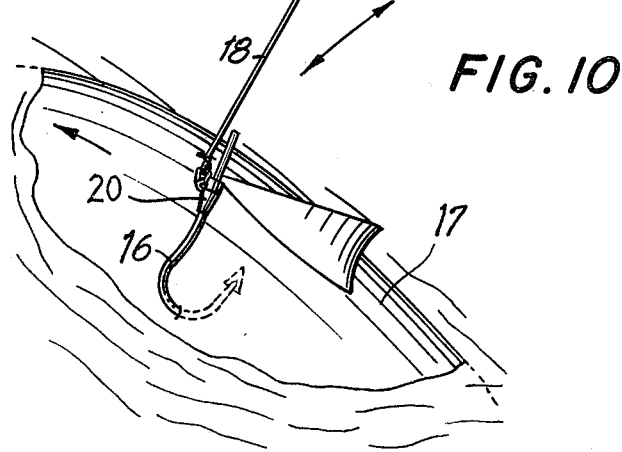
FIG. 10

FISHING GAFF

The ordinary fishing gaff consists of a pole, a hook-carrying member to be fitted on the end of the pole, and a cable or rope tied to the hook-carrying member. The hook-carrying member actually would be free to fall off the end of the pole unless the fisherman maintained his grip on the cable or rope end, for two purposes: (1) to hold the hook against separation from the pole as the pole is used to force the hook into the fish; and (2) then to continue in the grasp of the fishermen, when he releases his hold on the pole, and then proceeds to pull the hooked fish on board and out of the water. Obviously, a rope such as this, wet from the water, tends to slither with relation to the hand of the man holding the gaff pole; there may even result the unwanted release of the hook from the pole before the hook has been driven into the fish properly.

It is an object of the invention to provide means, wherein necessity for retention of the grasp on the cable or rope, during the manipulations for engaging the hook in the fish, is eliminated, and where grasping of the rope or cable by the fisherman is not required until after the fish has been hooked satisfactorily.

It is a further object of the invention to provide means wherein the hook for gaffing the fish is mounted and secured substantially positively against any movement with relation to the pole until the operation of gaffing the fish has been completed, and until after the hook has been engaged with the fish properly, whereupon the fishermen may, by mechanism provided for that purpose, and after he, or someone else, has retrieved the cable, disengage the hook entirely from the pole by a simple manipulation, whereupon the further work of bringing the fish on board the boat may be completed without being concerned with the disposition of the pole.

It is a further object of the invention to provide means which permit manipulation of a gaffing pole by relatively inexperienced persons, and by sturdy apparatus capable of relatively inexpensive manufacture.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the Statutes for disclosure of an operative embodiment, but not to show all the various forms and modifications in which the invention might be embodied.

On the drawings, in which the same reference characters refer to the same parts throughout, and in which is disclosed such a practical construction, FIG. 1 is a perspective view, showing the manner in which the apparatus of the invention may be manipulated by a fisherman to engage the hook in the fish without maintaining a hold on the rope or cable which is to be used in bringing the fish on board the boat;

FIG. 2 is a detail cross-sectional view of the gaffing pole, substantially on line 2—2 of FIG. 1, to an enlarged scale, and partially broken away;

FIG. 3 is a transverse cross-sectional view, substantially on line 3—3 of FIG. 2, and to a further enlarged scale;

FIG. 4 is a transverse cross-sectional view, substantially on line 4—4 of FIG. 2, and to a further enlarged scale;

FIG. 5 is a longitudinal cross-sectional view, substantially on line 5—5 of FIG. 4, of a detail of a clutching mechanism for holding parts of the gaff against separation;

FIG. 6 is a view, similar to FIG. 1, but showing the relation of the parts as the hook-carrying member is separating disengaged from the pole after actuation of an actuator or trigger on the pole;

FIG. 7 is a view, similar to FIG. 2, but is substantially a cross-sectional view on line 7—7 of FIG. 6, illustrating the relation of the parts as the hook-carrying member is permitted to separate from the pole;

FIG. 8 is a transverse cross-sectional view, to an enlarged scale, substantially on the line 8—8 of FIG. 7, illustrating the relationship of the parts at the time of separation of the hook-carrying member from the pole;

FIG. 9 is a longitudinal cross-sectional view substantially on the line 9—9 of FIG. 8, of a detail of the pole, illustrating the change of position of the parts, at the time of separation, as different from their position shown in FIG. 5; and FIG. 10 is a perspective view to illustrate the manner in which the fisherman handles the rope after the hook-carrying member has separated from the pole.

Gaff 10, as it appears in FIG. 1, is shown being manipulated by the hands 12 and 14 of the fishermen, to engage a hook 16 into a fish 17, which is in the water. Rope or cable 18, attached to a hook-carrying member 20, is shown as being free of hands 12 and 14 at the time of engagement of hook 16 into the body of fish 17. The loose end of rope 18, at the time gaff 10 and its hook 16, are manipulated to hook, or "gaff" the fish, may be tied to a root, if the fisherman is on shore, or to a part of the boat, if the fisherman is working from a boat. The rope is long enough so that it does not interfere, at any time, with the manipulations of gaff 10 and hook 16.

Hook-carrying member 20 may have a substantially integral spindle 22 which fits into and is slidable with relation to a bore 24 in a sleeve 26. Sleeve 26 may be snugly fitted, preferably press fitted, into tight engagement with the inner walls 28 of tube 30, which forms a major portion of the pole of gaff 10.

Spindle 22 is provided with a bore 32 into which extends a sleeve 34. A plunger 36 has a section 38 which consists of two cam faces 40 and 42 extending outwardly away from a section 44 of a reduced diameter. Sleeve 34 has a pair of apertures 46 extending through its walls. In walls 48 of bore 32 is recess 50 which is to be associated with apertures 46 and section 38. A pair of balls 52 may be carried in apertures 46.

In the position shown in FIG. 5, spindle 22 is held locked in engagement with sleeve 34 by means of balls 52. Sleeve 34, in turn, as will be described, is held securely in sleeve 26. This results when plunger 36 moves its section 38 so as to cam balls 52 into engagement in both apertures 46 and recess 50.

Interaction of balls 52 with apertures 46 and recess 50 will prevent separation of spindle 22, and hook 16 carried thereby, from gaff 10, until other parts of the apparatus, to be described, are actuated properly. Thus, hook 16 is held anchored to the gaff when balls 52 are in the position just described.

Sleeve 34 may terminate in an enlarged cage 54, the outer walls 56 of which are threaded as at 58. Threaded section 58 is received in a threaded recess 60 provided in the upper end of sleeve 26. A lock nut 62 secures sleeve 34 with relation to sleeve 26. Nut 62 engages against end wall 64 of sleeve 26, and thus will anchor cage 54 fixedly with relation to tube 30.

Cage 54 is hollow, and carries a spring 66 which is engaged between end wall 68 of the cage and a disk 70 fixed to plunger 36 at the position where plunger 36 changes from a circular cross-section to a polygonal cross-section 72. Section 72 passes through an opening 74 in wall 68. Section 72 is interfitted into opening 74 so as to prevent relative rotation of the assembled parts, including cage 54 and plunger 36.

An end 76 of section 72 is threaded to engage with a threaded section 78 of tube 80. A rod 82 extends into tube 80, and is held in position with relation to the tube by means of a cotter pin 84 extended through openings 86, through the walls of tube 80 and opening 88 through rod 82.

Rod 82 extends from tube 80 through tube 30, to a position where hand 14 may engage tube 30 for manipulations to be described. At the position, indicated by hand 14 a handhold 90 may be assembled with tube 30, to be held secured in position by means such as screws 92. An additional handhold 94 may be assembled on tube 30, for gripping by hand 12. A shield strip 96 may be associated with tube 30 at this position. Both tube 30, handhold 90 and shield strip 96 are provided with openings 98, 100 and 102 through which extends a portion of edge 104 of a plate 106.

Rod 82 has a bent end 108 which is engaged through an opening 110 located at the forward or downward end of plate 106. Plate 106 is pivoted on a cross pin 112, which is assembled in any desired manner in the walls of tube 30 and handhold 90. A short spring 114 may be seated in a recess 116 in plate 106 to bear against inner wall 28 of tube 30. Plate 106 normally will protrude through opening 98, 100 and 102. Pushing against plate 106 by the fingers of the fisherman holding the gaff will cause movement of rod 82 lengthwise of tube 30, and away from member 20. This action, of course, will cause movement of plunger 36 away from member 20 and compression of spring 66 (see FIG. 9.) This movement will place section 38 in position to receive balls 52. The result is that balls 52 no longer interlock apertures 46 and recess 50, and spindle 22 is free to separate from sleeve 34.

While balls 52 hold spindle 22 secured to sleeve 34, and thus to gaff 10, the fisherman is enabled, by manipulation of gaff 10, firmly to engage hook 16 in fish 17. After the hook has been engaged properly, plate 106 is depressed by hand 14, whereupon spindle 22 will separate from tube 30. Now the gaff pole, with its associated mechanism, may be laid aside, rope 18 may be picked up, loosened from wherever it has been anchored, and the fish then brought on board by pulling on rope 18.

A recess 118 may be formed in wall 120 of member 20. A small screw 122 may be secured in a threaded opening in the end face 124 of sleeve 26. The interengagement of screw 122 and the opening in end face 124, during manipulation of the gaff to hook the fish will prevent member 20, and hook 16 carried thereby, from turning with relation to the gaff pole.

At the end of tube 30, removed from the position of engagement of member 20 with its associated parts, a plug 126 may be fixed to one of the walls 28 of tube 30. A screw threaded recess 128 may be provided in plug 126, for the attachment of an extension rod 130 (FIG. 2, shown broken away).

Many other changes could be effected in the particular construction, and in the methods of use and construction, and in specific details thereof, hereinbefore set forth, without substantially departing from the invention intended to be defined herein, the specific description being merely of an embodiment capable of illustrating certain principles of the invention.

I claim:

1. A gaff for use by a fisherman, comprising a member carrying a hook for engagement with a fish, a pole, means mounted on the pole at one end for anchoring the member to the pole, and means carried by the pole for releasing the anchoring means to release the member and its hook from its anchorage with the pole, the releasing means having manipulating means positioned on the pole at a position removed toward the other end of the pole from the position of the anchoring means, the manipulating means providing means for actuation by the fisherman after a fish has been engaged by the hook.

2. The gaff of claim 1, a cable attached to the member, the cable being left free of engagement by either hand of the fisherman during the use of the pole and the member carrying the hook to engage the fish by the hook.

3. The gaff of claim 1, the pole being held by both hands of the fisherman during the step of gaffing a fish, and a cable attached to the member, the cable being free of engagement by either hand of the fisherman during the use of the pole and the member carrying the hook to engage the fish by the hook.

4. The gaff of claim 1, the member and the pole having means for interfitting engagement, and the anchoring means including means for separably coupling the interfitting means.

5. The gaff of claim 1, the member and the pole having means for interfitting engagement, the anchoring means including means for separably coupling the interfitting means, and the manipulating means including an actuator located close to that end of the pole removed from the member, the actuator being manipulatable by a hand of the fisherman holding the pole to actuate the manipulating means for separation of the interfitting means.

6. The gaff of claim 1, the pole being hollow, the member including a stem for interfitting engagement with the pole, and the anchoring means including means for separably coupling the stem to the pole.

7. The gaff of claim 1, the pole being hollow, the member including a stem for interfitting engagement with the pole, the anchoring means including means for separably coupling the stem to the pole, and the manipulating means including an actuator located close to that end of the pole removed from the member, the actuator being manipulated by a hand of the fisherman holding the pole to actuate the manipulating means for separation of the stem and its member from the pole.

8. A gaff for use by a fisherman, comprising a member carrying a hook for engagement with a fish, a pole, means carried by the pole for anchoring the member to the pole, and means for releasing the member and its hook from its anchorage with the pole, the releasing means having manipulating means at a position removed from the position of the member for actuation by the fisherman after a fish has been engaged by the hook, the pole being hollow, the member including a stem for interfitting engagement with the pole, the anchoring means including means for separably coupling the stem to the pole, the manipulating means including an actuator located close to that end of the pole removed from the member, and a rod extending through the pole from the actuator and having a clutch device for engaging the stem, resilient means for forcing the rod and the clutch device into engaging relation with the stem, the actuator being manipulatable by a hand of the fisherman holding the pole to move the rod against the action of the resilient means to cause the clutch to disengage the stem.

9. The gaff of claim 8, a cable carried by the member for securing the fish after the hook has been engaged in the fish, the cable being free of either hand of the fisherman during manipulation of the pole for engaging the fish by the hook.

10. The gaff of claim 8 a cable carried by the member for securing the fish after the hook has been engaged in the fish, the cable being free of either hand of the fisherman during manipulation of the pole for engaging the fish by the hook, and means between the member and the pole for preventing relative rotation of the member and the pole during gaffing of the fish.

* * * * *